Dec. 18, 1934.  L. J. CAMPBELL  1,984,354
TRANSMISSION MECHANISM FOR MOTOR VEHICLES
Filed Oct. 3, 1932  4 Sheets-Sheet 4
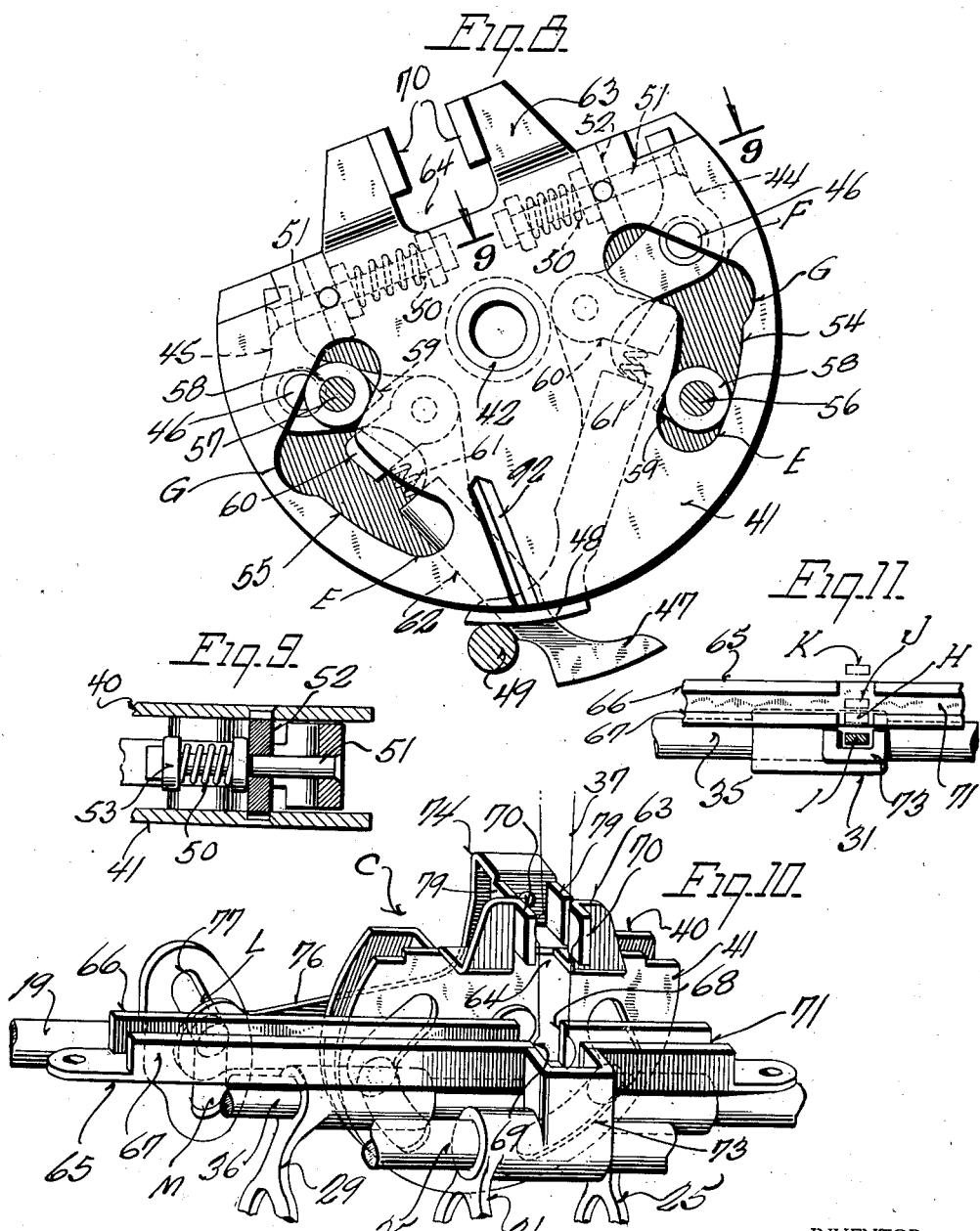
INVENTOR.
Leon Jay Campbell
BY
ATTORNEYS Patented Dec. 18, 1934

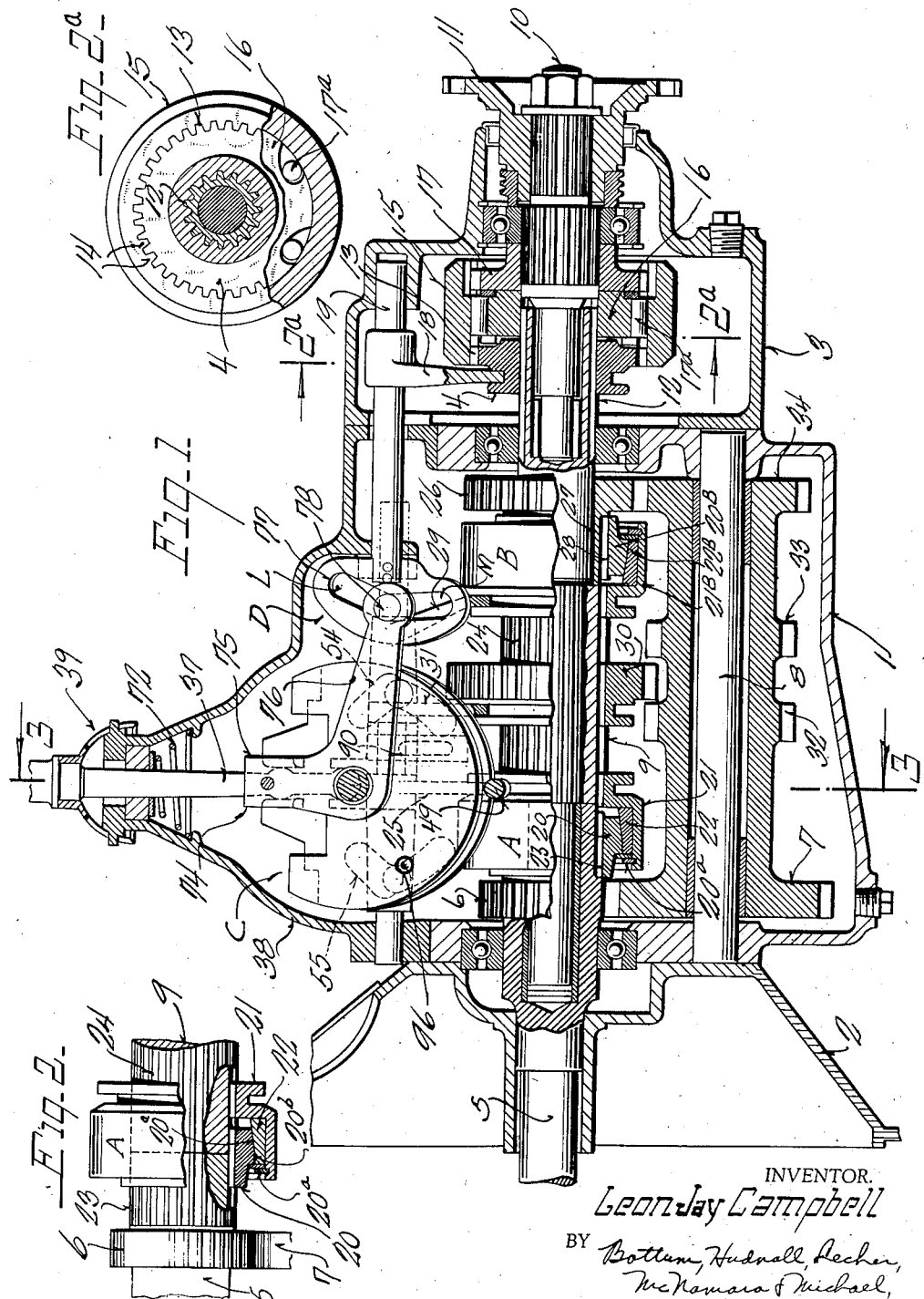

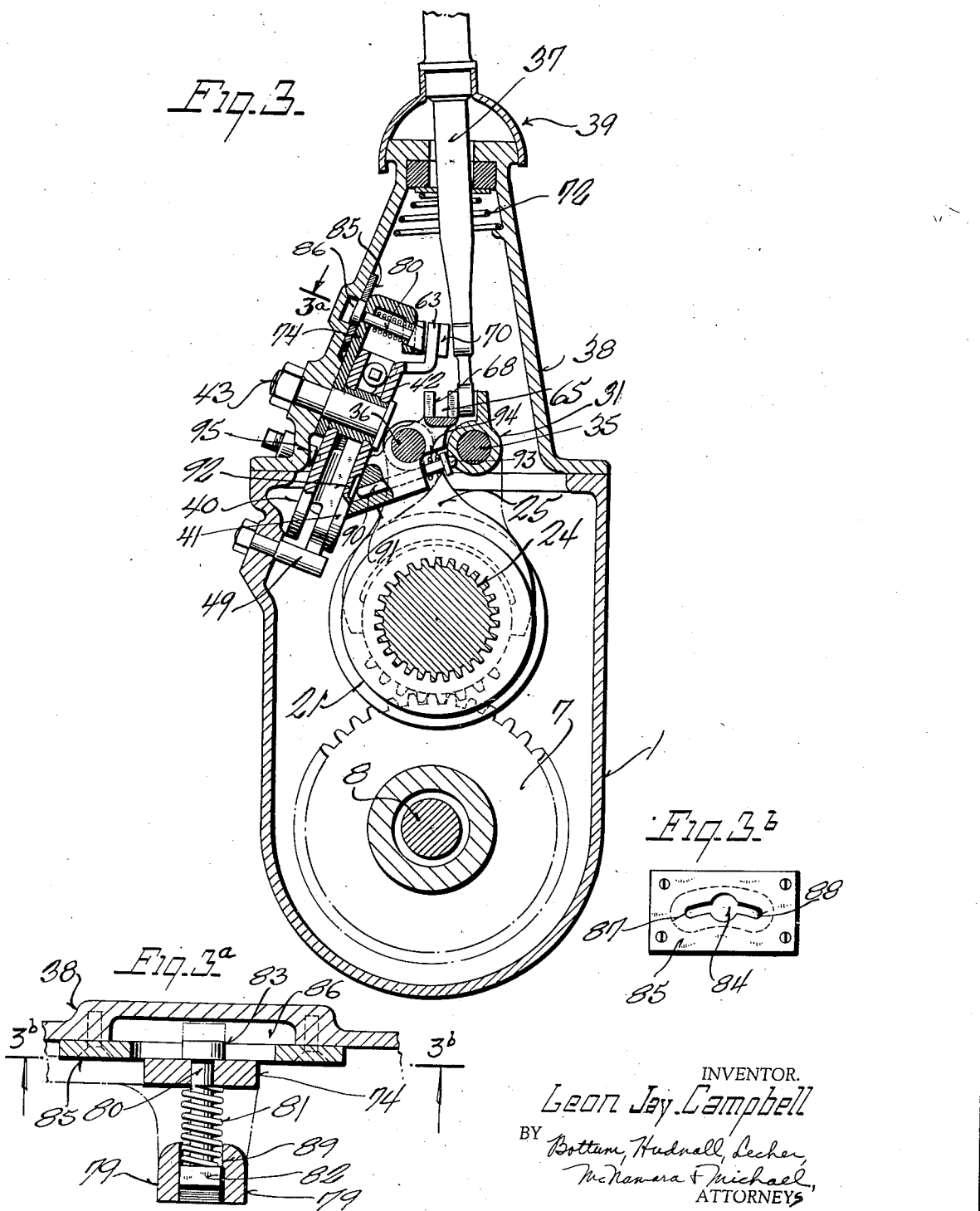

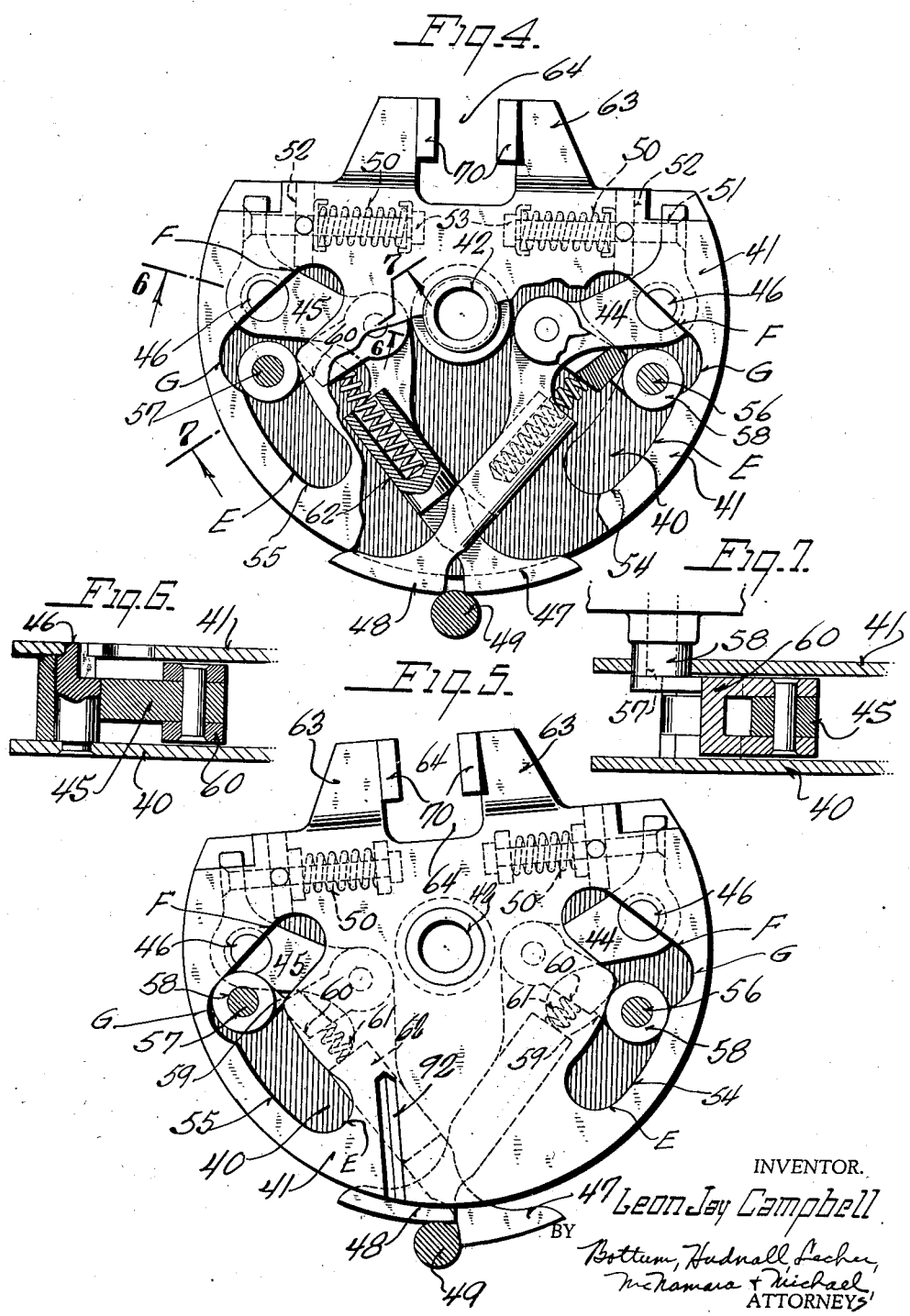

1,984,354

UNITED STATES PATENT OFFICE 1,984,354

TRANSMISSION MECHANISM FOR MOTOR VEHICLES

Leon Jay Campbell, Buchanan, Mich., assignor to Campbell-Buchanan Corporation, Chicago, Ill., a corporation of Illinois Application October 3, 1932, Serial No. 635,957

18 Claims. (Cl. 74—339)

This invention relates to transmission mechanisms for motor vehicles and more particularly to transmissions equipped with over-running clutch devices by which the drive of the engine on the vehicle is automatically released and re-established as the vehicle speed varies with respect to that of the engine.

The over-running clutch devices as heretofore employed have been so designed and constructed as to require a control element operable independently of the shift lever of the transmission. This control element in some installations is remote form the shift lever, while in others it is mounted on the shift lever. In either case, the driver of the vehicle is required to operate the control element independently of the shift lever to render the over-running clutch devices effective or ineffective as may be desired. The objection to this is that it imposes an extra duty on the driver of the vehicle in his manipulation of its controls and requires that he be conscious of the fact that a control element other than the shift lever must be operated to control the over-running clutch devices. Obviously this complicates the control of the vehicle in making speed changes through the transmission because the attention of the operator is necessarily divided between that required to make the speed changes and that required to control the over-running clutch devices. This is a decided hindrance to car control because the driving public have been taught the conventional method of hand shifting through a hand lever and by the addition of a control element for the over-running clutch devices it is necessary to school the public to the use of this extra element as an adjunct to the method of the conventional hand shifting.

To overcome the objections referred to, I provide an arrangement whereby the over-running clutch devices are controlled through the operation of the hand shift lever of the transmission in the usual and normal method of hand shifting, thereby avoiding the use of an extra control for the clutch devices, either on the lever or remote therefrom, as heretofore.

In carrying out this object of my invention, I provide means whereby the hand shift lever of the transmission may be selectively connected with the over-running clutch device whereby the transmission may be used with or without such device as desired.

Another object of my invention is to so provide the device controls that the shift lever when connected therewith will operate the same in the usual movement of the lever in making speed changes, thus placing no extra duty on the operator except that required to move the lever while in neutral into a position to connect it with the device controls.

A further object of my invention is to provide guard means in association with the clutch controls to prevent unintentional connection of the shift lever with such controls, thereby avoiding connection of the lever with the controls except when purposely desired by the operator.

A further object of the invention is to so construct and arrange the guard means that it will automatically eject the shift lever or shifting means of the transmission out of its connection with the clutch controls on the shift lever reaching its neutral position and thus automatically position the lever for shifting the transmission without the use of the over-running clutch.

A further object of the invention is to have the guard means eject the shift lever into that path of the lever guide as provided for the speeds with which the over-running clutch is usable, thereby enabling any of said speeds to be immediately selected without being first required to drop or disconnect the over-running clutch.

In my co-pending application, Serial No. 535,-821, filed May 8, 1931, since issued into Patent No. 1,880,784, on October 4, 1932, I disclose and claim a transmission mechanism having for each of two of its speeds, namely second and high, a combined friction and positive clutch assembly for synchronizing the parts by the friction clutch prior to their connection by the positive clutch. To actuate these clutches in sequence, a cam action is employed. This cam action serves to operate the friction clutch as well as the positive clutch, thereby preventing any gain in leverage or power in the operation of the same.

The object of my present invention with respect to the cam mechanism is to provide a lever action for closing the friction clutches thereby enabling an increased leverage to be employed for closing or setting such clutches. In this way, a force or power greater than that obtainable by the cam alone may be had to close the friction clutches. Moreover, by the lever action a sufficient mechanical energy may be stored, as by the use of springs to close the friction clutches when released in the actuation of the cam device. The power of the springs is stored through the movement of the levers into cocked positions on the return of the cam by the shift lever to its neutral position. The storing and releasing of this power is controlled through the movement of the cam by the shift lever without placing any additional strain or effort on the operator.

A further object of my invention is to provide the dogs on the levers and the cooperating projections therefor on the clutch shifters with substantially flat contact surfaces so that the levers when released will remain in engagement with the shifters to close the friction clutches even though the levers are carried around with the cam.

A further object of my invention is to control the release of the levers to the action of their springs by a fixed abutment with respect to which the cam is movable, said abutment holding the levers in cocked positions when the cam is in neutral position.

A further object of my invention is to cross the levers where they co-act with the abutment so that one lever will be held in cocked position by the abutment while the other is released therefrom.

Other and further objects of my invention will appear from the following specification taken in connection with the following drawings, in which—

Fig. 1 is a longitudinal sectional view, with parts in elevation, of an automotive transmission mechanism embodying the features of my invention;

Fig. 2 is an elevational view, with parts broken away and in section, of one of the clutch devices to be hereinafter described;

Fig. $2^a$ is a transverse sectional view taken on line $2^a$—$2^a$ of Fig. 1;

Fig. 3 is a similar sectional view taken on line 3—3 of Fig. 1;

Fig. $3^a$ is a sectional view taken on line $3^a$—$3^a$ of Fig. 3;

Fig. $3^b$ is a sectional view taken on line $3^b$—$3^b$ of Fig. 3 and

Fig. 4 is a front view of the cam device and lever assembly in neutral positions, parts being broken away and in section respectively, for clearness of illustration;

Fig. 5 is a similar view of the same assembly, shifted however to one of its intermediate positions;

Figs. 6 and 7 are transverse sectional views taken on lines 6—6 and 7—7 respectively, of Fig. 4, to show details of construction;

Fig. 8 is a view of the cam device and lever assembly shifted to one of its terminal positions;

Fig. 9 is a transverse sectional view taken on line 9—9 of Fig. 8 to show a detail of construction;

Fig. 10 is a perspective view of the entire control assembly for the transmission; and Fig. 11 is a top plan view showing the various lateral positions to which the lower end of the shift lever may be shifted.

In the drawings, 1 indicates the outer casing of the transmission, 2 indicates a part of the bell housing for the main clutch at the front end of the transmission, and 3 indicates an over-running clutch device at the rear end of the transmission, said device having a shiftable control member 4 for controlling the action of the clutch as shown in Figs. 1 and $2^a$.

The drive shaft 5 for the transmission extends into its case through the bell housing 2 and is there provided with a gear wheel 6. The latter is fixed to the shaft 5 and is in constant mesh with a gear wheel 7 revolubly mounted on the lay shaft 8. The main driven shaft 9 of the transmission is in line with the shaft 5 and has a spigot bearing connection therewith adjacent the gear wheel 6 as shown in Fig. 1. The opposite end of the shaft 9 is journaled in the transmission case and extends into the case of the over-running clutch device where it has a spigot bearing connection with the shaft 10 of that device. Shaft 10 extends beyond the case of its device and is connected with the propellor shaft (not shown) of the vehicle drive by a universal joint, one member 11 of which is shown in Fig. 1. The portion of the shaft 9 at the clutch device 3 is splined, as at 12, to slidably connect the control member 4 thereto. This member has peripheral teeth 13 to engage internal teeth 14 in the outer ring member 15 of the clutch, as shown in Fig. $2^a$. The inner ring member 16 of the clutch is fixed to the shaft 9 by the splines 12 and the outer ring member 15 is fixed to the shaft 10 by an interposed coupler 17 which has a toothed and a splined connection, respectively, with its associated parts, as shown in Fig. 1. Clutch rollers $17^a$ are interposed between the ring members as in devices of this character.

A yoke or shifter element 18 extending from a shift rod 19 engages the control member 4 to move the same into and out of clutched engagement with the outer ring 15 of the over-running clutch. In the assembly shown in Fig. 1, the rod 19 is arranged above the clutch and is slidably supported for endwise movement in the transmission and clutch cases 1 and 3, respectively.

Two clutch devices A and B are employed in the transmission shown in Fig. 1 to selectively connect the shaft 9 to the shaft 5. These clutch devices are of the same construction and operation and are claimed in my patent heretofore referred to. Each clutch device comprises a positive clutch and a friction clutch, the two being designed and arranged to operate in sequence for synchronizing the parts of the transmission controlled thereby prior to their positive connection.

As shown in Fig. 1, the clutch device A is at the front end of the transmission, and is employed to directly connect shafts 5 and 9 together for high speed or direct drive. The device A comprises clutch members 20 and 21, between which is a cooperating band or ring 22 of friction material. Clutch member 20 is slidably mounted, as by splines 23, on the portion of shaft 5 on the rear side of the gear wheel 6. Clutch member 21 is similarly mounted, as by splines 24, on the portion of the shaft 9 beyond the inner end of the shaft 5. The opposed portions of shafts 5 and 9 have the same diameter and their splines are alike so that when in register, member 20 may be slid partially onto shaft 9 to positively connect it with shaft 5 as shown in Fig. 2. Normally, members 20 and 21 are carried by their respective shafts, at which time the clutch device is inactive, as shown in Fig. 1. When clutch member 21 is moved by its shifter 25 toward clutch member 20, band 22 is compressed and shafts 5 and 9 are synchronized by the friction clutch connection between them. This occurs in the first part of the movement given to the shifter in making the speed change controlled by the clutch A. During the remaining portion of the movement of the shifter, the clutch member 21 is moved in a direction away from the clutch member 20, and the latter by the ring connection $20^a$ with the clutch member 21 over the band 22 moves clutch member 20 onto shaft 9. At this time and also when the clutch device is in neutral as shown in Fig. 1, the band 22 is not compressed between the clutch members, being supported by the concentric portion 20ᵇ of the clutch member 20 adjacent the rings 20ᵃ. The band slides on this portion in the relative axial movement of the clutch members and thus the band may be compressed on the inclined portion 20ᶜ of the clutch member 20 when the member 21 is moved toward the same. Member 20 at this time is pressed against the closed ends of the splines 23.

Revolubly mounted on the shaft 9 at the rear of the transmission is gear wheel 26 having a laterally extending hub 27 provided with external splines 28 by means of which the positive clutch member 20B of the clutch device B is slidably but non-rotatably supported by the gear. Clutch member 21B is slidably carried by the shaft 9 on the splined portion thereof for movement by its shifter 29 to control the compressibility of the band 22B in the same manner as described for the clutch assembly A.

Slide gear 30 of the transmission is on the splined portion 24 of the shaft 9 between clutch devices A and B and is shiftable by a shifter 31 into and out of mesh with either of gear wheels 32, 33 on the lay shaft 8. One of these gear wheels, as for instance the gear 32, is the low speed gear of the transmission, while the other gear 33 forms a part of the reversing gear assembly. Gear wheel 26 is in constant mesh with a gear wheel 34 on the lay shaft 8 and provides the second or intermediate speed for the transmission. All of the gear wheels on the lay shaft are spooled, that is, they are integrally connected by a sleeve for rotation in unison.

The control or shifting mechanism for the transmission and the over-running clutch are located above the gear assembly in the installation shown in the drawings and is the part of the mechanism to which my present invention particularly relates. This mechanism includes a pair of parallel rods 35, 36 (Figs. 3 and 10) supported in the upper part of the transmission case and on which the shifters 25, 29 and 31 are slidably mounted. One rod provides a support for shifters 25 and 29 which control the second and high speeds. The other rod supports the other shifter 31 which controls low speed and reverse.

The shifting mechanism in accordance with my invention embodies two cam devices C, D for controlling certain of the speed changes of the transmission and the action of the over-running clutch, respectively. These cam devices are constructed and arranged to act in conjunction with each other when shifting the transmission while the over-running clutch is used therewith. At other times the cam device for the over-running clutch is inactive. Both cam devices, however, are operable through a common control member which is the hand shift lever 37 of the transmission assembly. Said lever extends above and out of the transmission case through a cover section 38 and has a universal mounting at 39 thereon permitting movement of the lever in a forward and a rearward direction as well as in lateral direction as in structures of this character.

Cam device C comprises a pair of inner and outer plates 40, 41 connected together and maintained in spaced relation by a coupling sleeve 42 through which extends a bolt 43 by which the cam device is turnably mounted in the cover 38 of the transmission case on one wall thereof as shown in Fig. 3. A pair of levers 44, 45 are fulcrumed adjacent their upper ends between the plates on supports 46, 46 as shown in Figs. 4, 5 and 6. The lower ends of the levers are constructed to cross each other as shown and have oppositely directed terminal extensions 47, 48 which coact with a fixed abutment 49 below the cam device. The abutment 49, as shown in Fig. 3, is in the form of a bolt secured to one of the side walls of the transmission case 1 beneath the cam device and cooperating with the levers in the manner to be hereinafter described. Coiled springs 50, 50 are arranged between the plates above the sleeve 42 and are connected with the upper ends of the levers to move them when their lower ends are released from the abutment. Each spring, as shown in Fig. 9, is connected with its associated lever by a bolt 51 fixed to the lever and extending through and beyond a supporting block 52 arranged between and secured to the plates. The spring 50 bears at one end against the block and at its other end against a retainer 53 on the bolt.

The cam device C is mounted in the transmission case with the plate 41 innermost and adjacent the rod 36 which supports the shifters 25 and 29. For actuating these shifters independently, the plate 41 is provided with a pair of reversely arranged cam slots 54, 55 one for each shifter. Pins 56, 57 extend into the slots from the respective shifters and carry rollers 58, 58 which fit the slots and thus connect cam device C with the shifters. The pins are headed to hold the rollers thereon, said heads being in the space between the plates of the cam device and each having an angular projection 59 for cooperation with a dog 60 pivoted on the associated lever. The dogs are normally pressed upwardly by coil springs 61, 61 carried by the levers as shown. In the particular structure illustrated in the drawings, the levers are provided at their sides with barrels 62, 62 to receive and retain the springs.

An upward extension 63 is provided on the inner plate 41 directly above the mounting 43 for the cam device. This extension is offset inwardly from the cam device as shown in Fig. 3 so as to be in the path of movement of the lower end portion of the hand shift lever 37, the extension having a vertical slot 64 to receive the lever. When the lever is engaged with the plate 41, the entire cam device will be turned about its mounting 43 as the upper end of the lever is moved from front to rear. When the lever 37 is in neutral position, the cam device is also in its neutral position as shown in Fig. 4, and the slot 64 is directly opposite the lever so that the latter may be moved laterally into and out of said slot. When the lever is in the slot, a forward and backward movement of the upper end of the lever to attain second and high speeds will rock the cam device on its pivotal mounting and actuate the synchronizing and positive clutches in sequence associated with such speeds.

When the cam device is in neutral, the rollers 58 on the shifter pins are located in the concentric portions E of the cam slots 54, 55 adjacent their junction with the eccentric portions F of said slots as shown in Fig. 4. The projections 59 on the pins overlap the adjacent ends of the dogs 60 and the shifters are held against accidental movement due to the rollers completely bridging the slots and being in contact with the side walls thereof. When the shift lever 37 is moved in a direction to select one speed, as for example, high or direct drive, the lower end of the lever is moved forward. This rocks the cam device into the position shown in Fig. 8. During the movement of the cam device into this position the eccentric portion F of the cam slot 55 is brought into engagement with the roller 58 on the pin 57. At the beginning of this action the widened portion G of the cam slot at the junction between its sections E and F is brought opposite the roller. At the same time the lower end of the lever 45 is moved off of the abutment 49, thus releasing the lever to the action of its spring 50. The latter in expanding forces the lever through its dog 60 against the pin 57 and moves the same cross-wise of the widened portion of the cam slot to close the friction clutch. The lever moves independently of the rotation of the cam plates at this time and holds the friction clutch closed until the dog is released from the projection 59 by the continued rotation of the plates. This carries the dog out of operative engagement with the projection, at which time the eccentric portion of the cam slot acts on the pin to first open the friction clutch and then close the positive clutch. The spring 61 prevents the dog from dropping out of operative engagement with its projection 59, and with flat contacting surfaces on these parts, as shown in drawings, the dog is retained in abutting engagement with its projection during the closing of the friction clutch during the rotation of the cam plates. The spring 61 also permits the dog 60 to be depressed in the reverse rotation of the cam plates to neutral position so that the dog will return to its operative position without closing the friction clutch. During the operation of the cam device on the shifter 25, the pin 56 of the other shifter 29, is retained in the concentric portion E of the cam slot 54 and thus no movement is given to the shifter to disturb the neutral position of the clutch device B. The lever 44 for that clutch is not moved, its terminal portion 48 riding on the abutment 49 as shown in Fig. 8. Attention is called to the fact that the lower terminal portions of the levers are elongated and have curved lower edges concentric with the cam plates to retain connection with the abutment in the rotation of the plates in opposite directions. The levers at the abutment are disposed in crossing relation so that a single abutment may be used with both levers and release the levers in alternation as the plates are swung back and forth for the two speeds controlled thereby.

On returning the shift lever 37 to neutral from its high speed or direct drive position, the cam device is rocked toward the right when viewed as in Fig. 8, and the eccentric portion F of the cam slot 55 acts on the pin 57 to open the positive clutch. At the same time the abutment 49 causes the lever 45 to be moved about its fulcrum 46 to compress the spring 50 for further action when released by the abutment. In the continued movement of the cam device, the lever 45 is carried therewith and its terminal portion 47 brought on top of the abutment, as shown in Fig. 4. In the movement of the lever 45 to compress or set the spring, the dog 60 snaps past its projection 59, so as to be opposite the projection for closing the friction clutch when the lever is again released from the abutment. The movement of the cam device stops when the pin 57 reaches the concentric portion of the slot 55 as shown in Fig. 4.

The cam slot 54 which controls the action of the clutch assembly B for second or intermediate speed acts on its pin 56 in the same way as the cam slot for the other pin. The lever 44 is released from the abutment 49 when the cam device is turned toward the right as viewed in Fig. 4. This will release the lever to the action of its spring 50 and the friction clutch controlled by said lever will be closed when the widened portion of the slot 54 is brought opposite the pin 56. Continued rotation of the cam device will first open the friction clutch and then close the positive clutch and on return movement of the cam device will open the positive clutch and reset the lever 44, the same as for the clutch device A. The concentric portions of the cam slots are arcuate in shape so that the cam device may be rotated without shifting one pin while shifting the other. The eccentric portions of the cam slots are inclined so that the side walls thereof which are substantially straight and parallel will reversely act on the pins to move the shifters horizontally back and forth or from front to rear of the transmission.

The lower end of the shift lever 37 in its lateral movements cooperates with a guide fixture 65 which is mounted in the transmission case above the gear section and extends longitudinally thereof. This fixture, as clearly shown in Fig. 10, is of the trough or channel type, having upright side walls 66, 67, provided intermediate their ends with alined vertical slots 68, 69 through which the lower end of the shift lever passes in being given lateral or sidewise movement. These slots are disposed to be in the vertical plane of the slot 64 in the extension 63 of the cam device when the latter is in neutral position, and said extension is provided with outwardly extending lugs 70, 70 which as shown in Fig. 3 are disposed vertically above the channel 71 provided between the walls of the fixture 65. By this arrangement the shift lever becomes connected with the cam device C when it has been moved laterally in a direction to dispose its lower end in the channel 71. Thus the cam device will be actuated in the movement of the lower end of the lever back and forth in this channel. This is the action of the device when the gear set in the transmission is shifted in the so-called "conventional" manner, that is, to say, when the over-running clutch is not used therewith. When the shift lever is returned to alinement with slots 68, 69, a spring 72 at the universal mounting 39 acts to restore the lever to its upright neutral position as indicated at H in Fig. 11.

The rod 35 which supports the shifter 31 for the low speed and reverse is located along the outer side of the fixture 65 so that the recessed lug 73 on the upper side of the shifter 31 may be moved along the outer side of the fixture as shown in Figs. 10 and 11. When the slide gear 30 is out of mesh with gears 32 and 33, the shifter 31 occupies the position shown in Fig. 10 and its lug 73 is directly opposite the slot 69 so that the lower end of the lever 37 when moved laterally through and beyond slot 69 may be engaged with lug 73 for shifting gear 30. In this movement of the lever its lower end rides along the outer side of the wall 67 and thus retains its engagement with the lug. In Fig. 11, I indicates the position of the lever when engaged with the lug 73 whereas J indicates the position of the lever when engaged with the cam plates 40, 41 for conventional shifting of the transmission.

The action of the cam device D for the overrunning clutch device is also controlled through the shift lever 37. Device D comprises a bell crank lever 74 mounted on the same axis support 43 as provided for the cam device C and arranged between the same and the adjacent wall of the cover section 38 of the transmission case as shown in Fig. 3. Lever 74 is arranged with its short arm 75 extending above the axis bolt 43, and its long arm 76 extending in a general horizontal direction rearwardly from said bolt. Arm 76 overlaps the cam device D which as shown in Figs. 1 and 10, is in the form of a vertically disposed flat plate having a cam slot 77 therein. A pin 78 connects the outer or free end of the long arm of the lever with said slot.

The upper end of the short arm 75 of the lever is shaped to overhang the cam device C and is provided with outwardly projecting lugs or webs 79 to aline with the lugs 70 on the inner plate of the cam device when the parts are in neutral positions as shown in Figs. 3 and 10. This allows the lower end of the shift lever 37 to be engaged with the lugs 79 when connected with the cam device C through its slot 64. As shown in Fig. 3, the slot 64 in the projection 63 of the cam device extends to the plate 41 so that the shift lever may be moved far enough to be connected with the lever 74. When so connected, the lower end of the shift lever rides along the outer side of the wall 66 of the guide fixture (see position K, Fig. 11) and connects the over-running clutch mechanism with the transmission for high and second speeds.

The cam slot 77 in the plate D has divergent portions L, M arranged at the same angle to a line passing through the centers of axis member 43 and pin 78. Thus when the long arm 76 of the lever 74 is raised and lowered, an endwise movement will be given to the rod 19 to which the plate is attached, for sliding the clutch element 4 into and out of clutched engagement with the outer ring member 15 of the over-running clutch. The plate D is secured to the rod 19 in a slot therein to prevent turning of the plate as shown in Fig. 1.

When the long arm 76 of the lever 74 reaches the neutral position shown in Fig. 1, its pin 78 is at the junction between the sections L, M of the cam slot 77 and the control element 4 of the over-running clutch device is held in engagement with the outer ring 15 of that device to hold it out of action. When the arm 76 is moved upward, the element 4 is moved out of engagement with the ring 15 and the clutch device is thrown into action for high speed. When the arm 76 is moved downward, the control member 4 is also released from the ring 15 and the clutch device is thrown into action for the second speed. These movements of the arm are controlled through the hand shift lever 37 as it is moved back and forth in selecting the speeds referred to. With the pin 78 of the lever 74 in direct alinement with the rod 19 when the parts are in neutral, accidental release of the element 4 from the ring 15 is prevented and the clutch device will remain out of action until the operator wishes to connect it with the transmission.

To prevent unintentional movement of the shift lever into connection with the clutch device, I provide a guard which in the form shown in Figs. 3, 3ª and 3ᵇ comprises a plunger 80 slidably mounted in the upper end of the lever 74 above the cam device C. A coiled spring 81 about the plunger normally holds its outer end 82 in a position between the lugs 79 to be first met by the hand shift lever on moving it into the space between said lugs. The outer end of the plunger lies flush with the outer edges of the lugs to prevent accidental connection of the shift lever with the lugs as the lever is moved past the lugs in the shifting of the transmission in "conventional". The inner end of the plunger is headed as at 83, said head normally fitting in a similarly shaped aperture 84 in a plate 85 to lock the lever 74 against movement when in neutral position. Plate 85 is secured to the adjacent wall of the case 38 over a recess 86 therein to receive the head 83 when the plunger is moved by the shift lever into a position to release the lever 74 for movement. Plate 85 is provided with slots 87, 88 on opposite sides of the aperture 84, said slots opening into said aperture and being arcuate to permit movement of the lever 74 by the hand shift lever. The outer end of the plunger is headed, as shown, the portion of the lever at the plunger being apertured, as at 89, to receive said head when the plunger is moved into release position. The spring 81 is just stiff enough to prevent easy movement of the shift lever into connected relation with the lever 74. The advantage of this arrangement is that the operator is immediately notified by the resistance offered by the spring to the lateral movement of the shift lever that the lever has reached a position beyond which it is possible to connect the over-running clutch with the transmission. If the operator desires to operate the car without this clutch, he stops the lateral movement of the lever when it is resisted by contact with the plunger. Should he desire to operate the car with the clutch, he merely forces the lever further against the plunger and connects up the clutch device. In this way the operator is conscious of the fact that the clutch device can only be connected by overcoming the resistance offered by the spring 81 and thus need not go into free running unless he especially desires to do so. Another advantage of the spring and plunger arrangement is that the plunger acts to automatically eject the shift lever out of its connection with the lever 74 on the shift lever reaching neutral position. Thus, the over-running clutch device is automatically dropped without further action by the operator and the transmission is immediately conditioned for conventional shifting with all of the advantages thereof.

Other advantages of the invention disclosed herein are as follows:

The control of the over-running clutch device is solely through the hand shift lever of the transmission, thereby controlling both devices through one control, instead of making it necessary to operate two controls, one for the transmission and the other for the clutch device as heretofore. The advantage of having a single control for both devices is that the attention of the operator is not diverted when effecting speed changes through the transmission whether the over-running clutch is used or not. Moreover, in having a single control element and that element being the shift lever of the transmission, makes it unnecessary for the operator to use an unfamiliar element in throwing the clutch device into and out of action.

Another advantage of the invention is that the throwing in and out of the clutch device is extremely simple and free of any complicated mechanism and moreover is employed with the control for the transmission itself.

As to the mechanism for controlling the shifting of the synchronizing clutches in the transmission, the advantages are that the action of closing the friction clutches does not depend upon the leverage afforded by the cam slots and shift lever alone. The lever action increases the leverage and springs of relatively large power can be employed for closing the clutches without placing any undue burden on the operator in compressing the springs on returning the shift lever to neutral position. In compressing the springs and holding them set on cocking the levers, the stored up energy of the springs is available the instant required for closing the friction clutches. Moreover, this power when released operates in timed relation with the movement of the shift lever into a speed selecting position and effects closing of the friction clutch before the operator is conscious of the action. In other words, the lever action operates immediately it is released for operation in the movement of the shift lever in the normal method of hand shifting, the operator being merely required to move the shift lever to its position of speed. The construction is simple in design and operation and accomplishes the results desired with extreme ease and requires no more knowledge on behalf of the operator than that necessary for moving the shift lever into its various speed positions.

To hold the cam device C against accidental movement when in neutral position, I provide a plunger 90 slidably mounted in a bracket or web 91 fixed to the guide fixture 65, as shown in Fig. 3. This bracket is located between the cam plate 41 and the shifter supporting rod 35. The cam plate has a recess 92 and the shifter element 31 has a recess 93. These recesses are opposite each other when the cam device and the shifter element are in their neutral positions. The plunger 90 has a length to engage in one recess at a time so as to hold one device against movement while the other device is free. A coiled spring 94 is employed to normally move the plunger into engagement with shift element 31. The plunger when in the recess 93 holds the shifter element 31 against endwise movement and this maintains that element in position for connection with the hand shift lever. When the shifter element is moved by the lever, the plunger 90 is projected out of the recess 93 and is forced into the recess 92, thereby holding the cam device against rotation out of its neutral position. As a further aid in holding the cam device against rotation when in neutral, I provide a ball check 95 engageable with a recess 96 in the outer face of the plate 40 of the cam device as shown in Fig. 3.

The details of construction and arrangement of parts shown and described may be variously changed and modified without departing from the spirit and scope of my invention, except as pointed out in the appended claims.

I claim as my invention:

1. The combination with a change speed transmission and an overrunning clutch device for a motor vehicle, of shifting means for the transmission, a rockably mounted member connected with the clutch device to control the action thereof and disposed for interconnection with the shifting means, and guard means carried by said member to prevent unintentional interconnection of the shifting means with the member, said guard means being resilient to automatically eject the shifting means when interconnected with said member out of connection therewith on the member and the shifting means reaching neutral position and to automatically lock the member against accidental movement when in neutral position.

2. The combination with a change speed transmission having a case and an overrunning clutch device for a motor vehicle, of shifting means for the transmission, a rockably mounted member connected with the clutch device to control the action thereof and disposed for interconnection with said shifting means, and a spring pressed plunger carried by said member to prevent unintentional interconnection of the shifting means with the member, said plunger being depressed by the shifting means on being interconnected with the member, said plunger acting when the member and the shifting means reach neutral position to eject the shifting means out of its connection with the member and at the same time to engage the transmission case to lock the member against accidental movement when in neutral position.

3. The combination with a speed change transmission having a case and an overrunning clutch device for a motor vehicle, of shifting means for the transmission, a rockably mounted member connected with the clutch device to control the action thereof and disposed for interconnection with said shifting means, and a spring pressed plunger carried by said member to prevent unintentional interconnection of the shifting means with said member, said case having apertures and arcuate slots on opposite sides of the same, said apertures and slots coacting with the plunger to lock the member against movement when disconnected from the shifting means and to permit movement of the member by the shifting means when the plunger is moved out of engagement with the aperture.

4. The combination with a change speed transmission and an overrunning clutch device for a motor vehicle, of shifting means for the transmission, a rockably mounted member connected with the clutch device to control the action thereof, said member having lugs between which the shifting means is movable for connecting the same to said member, and a spring pressed plunger carried by said member at said lugs and having a head between the lugs to prevent unintentional connection of the shifting means with the member, said member being depressed by the shifting means on being connected with the member, said plunger acting when the member reaches neutral position to eject the shifter out of its connection with the member and to automatically lock the member against movement.

5. The combination with a change speed transmission and an overrunning clutch device for a motor vehicle, of a hand shift lever for the transmission, a pull rod connected with the clutch device and having cam means thereon for controlling the action of the clutch device, and means whereby the shift lever may be selectively connected with the cam means on the rod for actuating the same through the movement of the lever in shifting the transmission.

6. The combination with a change speed transmission and an overrunning clutch device for a motor vehicle, of a hand shift element for the transmission, a pull rod connected with the clutch device and provided with a member having a cam slot to control the action of the clutch device, a bell-crank lever fulcrumed adjacent said member and having one arm engaging said cam slot to actuate the member and its pull rod in the swinging of the lever, and means on the other arm of the lever whereby the shift element may be engaged with the lever for actuating the same in the shifting of the transmission.

7. The combination with a change speed transmission and an overrunning clutch device for a motor vehicle, a hand shift element for the transmission, a cam member connected with the clutch device for controlling the action thereof, a bell crank lever fulcrumed adjacent said member and having one arm connected therewith for operating the same in the swinging of the lever, a guide providing parallel paths of movement for the shift element in shifting the transmission, and means on the other arm of the lever whereby the shift element may be engaged therewith for actuating the same, said means extending over one of the paths of movement as provided for said guide whereby the transmission may be shifted with or without the use of the clutch device.

8. In a change speed transmission mechanism for motor vehicles, a shifter element for a speed of the transmission, a synchronizing clutch assembly for said speed and having a friction clutch and a positive clutch, a rotatable device having a cam slot engageable with a projection on the shifter element for controlling the action of the clutches therethrough, said slot having a widened portion at one point in the length of the same, a lever and an actuator therefor carried by said device and operable on the shifter when at the widened portion of the slot to close the friction clutch independently of the rotation of said device, and a stationary abutment for resetting the lever and its actuator on returning the device to its neutral position.

9. In a speed change transmission for motor vehicles, a pair of shifter elements for controlling two speeds of the transmission, a pair of synchronizing clutch assemblies, one for each of said speeds, and each having a friction clutch and a positive clutch, a rotatable device having cam slots engageable with projections on the shifter elements for controlling the action of the clutches therethrough, said slots each having a widened portion and eccentric and concentric portions on opposite sides of the same, a pair of spring pressed levers carried by said device, one for each of the shifter elements, and operable on the projections thereof when at the widened portions of the slots for closing the friction clutches independently of the rotation of said device, and a stationary abutment common to both levers and co-acting therewith in the rotation of said device to neutral position for resetting the levers and their respective springs for holding them for further action when released from said abutment.

10. In a change speed transmission mechanism for motor vehicles, a pair of shifter elements for two speeds of the transmission, a pair of synchronizing clutch assemblies, one for each of said speeds and having a friction clutch and a positive clutch, a rotatable device having cam slots engageable with projections on the shifter elements for controlling the action of the clutches therethrough, said slots each having a widened portion and eccentric and concentric portions on opposite sides of the same, a pair of spring pressed levers carried by said device, one for each of the shifter elements and operable on the projections thereof when at the widened portions of the slots for closing the friction clutches independently of further rotation of said device, said levers being arranged in crossing relation and having oppositely extending terminal projections exterior of the device, and a fixed abutment cooperable with the terminal portions of the levers in the rotation of the device to control the setting and the release of the levers.

11. In a speed change transmission for motor vehicles, a shifter element for one speed of the transmission, a synchronizing clutch assembly for said speed and having a friction clutch and a positive clutch, a rotatable device having a cam slot co-acting with a projection on the shifter element for controlling the action of the clutches therethrough, said slot having a widened portion at one point in the length of the same, a spring pressed lever carried by said device, a dog pivoted on the lever for moving the projection when at the widened portion of the slot to close the friction clutch independently of further rotation of the device, and means for resetting the lever on returning of the lug to its neutral position, said projection and dog having substantially flat contacting surfaces so that the parts will remain in contact until the clutch is set as the lever is carried around with the cam device.

12. The combination with a change speed transmission and an overrunning clutch device for a motor vehicle, of means for controlling the action of the clutch device, means for controlling the shifting of the transmission, a hand shift lever, and means associated with said control means, whereby the lever may be interconnected with both control means for shifting and using the transmission with the clutch device or be interconnected only with the control means of the transmission for shifting and using the transmission without the clutch device.

13. The combination with a change speed transmission and an overrunning clutch device for a motor vehicle, of means for controlling the action of the clutch device, means for controlling the shifting of the transmission, a hand shift lever, lugs carried by the control means whereby the lever may be interconnected therewith, said lugs being so disposed that the lever may be interconnected with both control means for shifting and using the transmission with the clutch device or be interconnected only with the control means of the transmission for shifting and using the transmission without the clutch device, and guard means associated with the lugs of the clutch control means to prevent unintentional interconnection of the lever therewith.

14. The combination with a change speed transmission and an overrunning clutch device for a motor vehicle, of movably mounted means, one for controlling the action of the clutch device and the other for controlling the shifting of the transmission, a hand shift lever, a pair of spaced lugs carried by each control means, and means for releasably holding the control means, when both are in neutral positions, with the spaces between their lugs in register, whereby the lever may be interconnected with both sets of lugs for shifting and using the transmission with the clutch device or be interconnected only with the lugs of the transmission control for shifting and using the transmission without the clutch device.

15. In a change speed transmission mechanism for motor vehicles, a synchronizing clutch assembly for relatively rotatable members of the transmission and having a friction clutch and a positive clutch, a shifter element for opening and closing said clutches, a device operable in the shifting of the transmission for actuating the shifter element, power actuated means carried by said device and operable on the shifter element for closing the friction clutch, and a trip for said means, said device being movable with respect to the trip whereby to release the power operated means from the trip to close the friction clutch in advance of the closing of the positive clutch in the movement of the device in a direction to connect said members and to reset said means by engagement with the trip in the movement of the device in the opposite direction to disconnect said members.

16. In a speed change transmission mechanism for motor vehicles, a synchronizing clutch assembly for relatively rotatable members of the transmission and having a friction clutch and a positive clutch, a shifter element for opening and closing said clutches, a device operable in the shifting of the transmission for actuating the shifter element, a lever and a spring actuator therefor carried by the device and operable on the shifter element for closing the friction clutch, and a stationary abutment, said device being movable with respect to the abutment whereby to release the lever from the abutment to close the friction clutch in advance of the closing of the positive clutch in the movement of the device in a direction to connect said members and to reset the lever by engagement with the abutment in the movement of the device in the opposite direction to disconnect said members.

17. In a speed change transmission mechanism for motor vehicles, a synchronizing clutch assembly for relatively rotatable members of the transmission and having a friction clutch and a positive clutch, a shifter element for opening and closing said clutches, a device operable in the shifting of the transmission for actuating the shifter element, a lever and a spring actuator therefor carried by the device and operable on the shifter element for closing the friction clutch, a stationary abutment for the lever, said device being movable with respect to the abutment whereby to release the lever from the abutment to close the friction clutch in advance of the closing of the positive clutch in the movement of the device in a direction to connect said members and to reset the lever by engagement with the abutment in the movement of the device in the opposite direction to disconnect said members, and co-acting means on the lever and the shifter element to retain their operative connection to close the friction clutch as the lever is moved with said device.

18. In a change speed transmission mechanism for motor vehicles, a pair of synchronizing clutch assemblies, one for each of two speeds of the transmision and each clutch assembly having a friction clutch and a positive clutch, a shifter element for each clutch assembly, a device operable in the shifting of the transmission for actuating said shifter elements, a pair of spring pressed levers carried by said device, one for each of said shifter elements and operable thereon for closing the friction clutches, and trip means for said levers, said device being movable with respect to said trip means whereby to release the levers from the trip means to close the friction clutches in advance of the closing of the positive clutches in the movement of the device in a direction to engage the clutch assemblies and to reset said levers by engagement with the trip means in the movement of the device in the opposite direction to disengage the clutch assemblies, said trip means holding both levers in their set positions when both clutch assemblies are disengaged and holding one lever in its set position when the other lever is released.

LEON JAY CAMPBELL.